3,287,165
HIGH CAPACITY LEAD ACID BATTERY WITH LEAD CALCIUM NEGATIVE GRIDS

Henry E. Jensen, Lafayette Hill, Pa., assignor to Eltra Corporation, Toledo, Ohio, a corporation of New York
No Drawing. Filed Dec. 3, 1964, Ser. No. 415,790
1 Claim. (Cl. 136—65)

This invention relates to storage batteries and more particularly to the lead acid type wherein the positive grid is composed of a lead antimony alloy and the negative grid of a lead calcium alloy.

Conventional lead acid batteries of both the Fauré flat pasted plate types and, also, the tubular type generally use lead antimony or a modified lead antimony alloy sometimes, but not always, singularly or in combination with small additions of silver, arsenic, copper, tellurium and tin in the grid structures of both the positive and negative plates. In limited types of service sometimes pure lead or lead electroplated lead antimony grids are used in the negative plate.

While the use of antimony is advantageous in hardening of grids and plates, it produces an undesirable side reaction at the negative plate since the antimony will react with the active material at the negative plate resuling in self-discharge or local action. This undesirable side reaction is sometimes referred to in the trade as "antimony poisoning." Presence of antimony at the negative plate also reduces the hydrogen over voltage and, therefore, cells made by this method are subjected to substantial over charge which gradually increases as the cells age when charged from a fixed voltage bus generally referred to in the trade as "floating the line," or in the case of batteries in cycle service, such as used for electric trucks or mine locomotives, by the modified constant potential charging method.

When cells are manufactured with lead antimony grids, the presence of the antimony at the surface of the grid automatically reduces the hydrogen over voltage "as soon as the plates are formed" (electrochemically changed from the inactive raw materials when first manufactured into active materials). In addition to the presence of the antimony at the negative plate from the beginning, antimony present in the positive grid will migrate to the negative plate by "plating" or "reducing" action. Accordingly, it has always been desirable, therefore, to manufacture the positive grids with as low a percentage of antimony as possible and utilizing other alloying agents to help provide the desired increase in hardness and tensile strength.

If antimony is eliminated from the negative grids in the beginning, the hydrogen over voltage is at a maximum and therefore the current through the cell for any given charging voltage, once cells are charged, is reduced. The lower the charging current the less the over charge and therefore the longer the life of the cell as well as a reduction of water loss, from the cell electrolyte, which in turn reduces the maintenance. Lower charging or finishing rates, while floating the line or recharging after a discharge, once the cells are charged, reduces the corrosion of the positive grids, which in turn therefore reduces the amount of antimony released from the grid and, therefore, less antimony reduction or "poisoning" at the negative plate.

Use of pure lead or lead plated negative grids are difficult to manufacture and too costly to use in conventional lead acid batteries. Therefore, use of such grids is limited to special application which can absorb the extra cost. Manufacture and use of lead calcium negative grids, however, are much less costly and therefore fulfill this desirable feature. Calcium alloyed with lead produces a grid of equivalent tensile strength and hardness to that given by the use of antimony but without the undesirable side reaction, since calcium is electro-negative to lead and therefore the calcium on the surface of the negative grid will react with the sulfuric acid to form calcium sulphate, an inert material in the lead acid storage battery.

It is, therefore, a principal object of this invention to provide a lead acid battery which will have longer life, less water consumption and lower maintenance.

Other objects and advantages of this invention relating to the arrangement, operation and function of the related elements of the structure, to various details of construction, to combinations of parts and to economies of manufacture will be apparent to those skilled in the art upon consideration of the following description and appended claims.

Batteries manufactured in accordance with the present invention have positive grids cast from an antimony lead alloy, with the antimony content being in the range of 3 to 10% by weight. Other alloying metals may also be included in small amounts such as silver, arsenic, tin, copper and tellurium when special characteristics are required. The negative grids are cast from a calcium lead alloy with the calcium content being from .01 to .10% by weight.

These grids are then pasted by standard manufacturing procedures and are then fabricated into batteries in the usual way. It has been found desirable to fabricate the connecting straps between the separate grids forming the positive and negative cell elements and between adjacent battery cells from pure lead so as to reduce the electrical resistance of the battery.

Batteries constructed as disclosed above have been found to have high capacity combined with long service life and reduced maintenance and service, including a reduced number of water additions to maintain the electrolyte at the required level. The local action within the battery is greatly reduced by the absence of antimony at the negative plate, with a reduction in antimony poisoning and reduced hydrogen overvoltage. Furthermore, at present market prices, calcium is cheaper than antimony thereby reducing the cost of the battery.

It is to be understood that the above detailed description of the present invention is intended to disclose an embodiment thereof to those skilled in the art, but that the invention is not to be construed as limited in its application since the invention is capable of being practiced and carried out in various ways without departing from the spirit of the invention. The language used in the specification relating to the operation and function of the elements of the invention is employed for purposes of description and not of limitation, and it is not intended to

What is claimed:

A storage battery of high capacity for deep cycle service, comprising Fauré type positive and negative plates, the grids of the positive plates consisting essentially of an alloy of lead and antimony, said antimony in the range of 3% to 10% by weight, and the grids of the negative plates consisting of an alloy of lead and calcium, said calcium in the range of .01% to .10% by weight.

References Cited by the Examiner

UNITED STATES PATENTS

| 1,907,420 | 5/1933 | Finn | 136—168 |
| 2,042,840 | 6/1936 | Haring | 75—167 |

FOREIGN PATENTS

| 209,750 | 1/1924 | Great Britain. |

WINSTON A. DOUGLAS, *Primary Examiner.*

A. SKAPARS, *Assistant Examiner.*